(12) United States Patent
Wald et al.

(10) Patent No.: US 9,396,235 B1
(45) Date of Patent: Jul. 19, 2016

(54) SEARCH RANKING BASED ON NATURAL LANGUAGE QUERY PATTERNS

(71) Applicant: Google Inc., Mountain View, CA (US)

(72) Inventors: Jonathan Wald, New York, NY (US); Ilya Mezheritsky, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 14/105,460

(22) Filed: Dec. 13, 2013

(51) Int. Cl.
*G06F 17/30* (2006.01)

(52) U.S. Cl.
CPC ...... *G06F 17/3053* (2013.01); *G06F 17/30442* (2013.01); *G06F 17/30663* (2013.01); *G06F 17/30976* (2013.01)

(58) Field of Classification Search
USPC .......................................... 707/723, 713, 769
See application file for complete search history.

(56) References Cited

U.S. PATENT DOCUMENTS

| | | | | |
|---|---|---|---|---|
| 6,081,774 | A * | 6/2000 | de Hita | G06F 17/30663 704/9 |
| 6,665,666 | B1 * | 12/2003 | Brown | G06F 17/30672 |
| 8,005,842 | B1 * | 8/2011 | Pasca | G06F 17/30634 707/741 |
| 8,370,347 | B1 | 2/2013 | Zhang | |
| 2003/0069880 | A1 * | 4/2003 | Harrison | G06F 17/30663 |
| 2004/0117352 | A1 * | 6/2004 | Schabes | G06F 17/30684 |
| 2007/0055656 | A1 * | 3/2007 | Tunstall-Pedoe | G06F 17/30654 |
| 2007/0094006 | A1 * | 4/2007 | Todhunter | G06F 17/2785 704/8 |
| 2010/0082331 | A1 * | 4/2010 | Brun | G06F 17/2705 704/9 |
| 2010/0235164 | A1 * | 9/2010 | Todhunter | G06F 17/30654 704/9 |
| 2011/0047159 | A1 * | 2/2011 | Baid | G06F 17/3071 707/738 |
| 2011/0093452 | A1 * | 4/2011 | Jain | G06F 17/30864 707/723 |
| 2012/0078826 | A1 * | 3/2012 | Ferrucci | G06N 7/005 706/12 |
| 2012/0078891 | A1 | 3/2012 | Brown | |
| 2012/0143839 | A1 | 6/2012 | Zhou | |
| 2012/0226492 | A1 * | 9/2012 | Tsuboi | G06F 17/30684 704/9 |
| 2013/0262501 | A1 * | 10/2013 | Kuchmann-Beauger | G06F 17/30451 707/769 |

FOREIGN PATENT DOCUMENTS

| | | |
|---|---|---|
| WO | WO9825217 A1 | 6/1998 |
| WO | WO2011026145 A3 | 8/2011 |

OTHER PUBLICATIONS

'How to re-rank search results based on linguistic score,' [online] [Retrieved on Dec. 13, 2013]; Retrieved from the Internet URL: http://search-engineering.blogspot.com/2012/09/how-to-re-rank-search-results-based-on.html#!/2012/09/how-to-re-rank-search-results-based-on.html; 4 pages.

Radev et al., 'Query Modulation for Web-based Question Answering,' [online] [Retrieved on Dec. 13, 2013] Retrieved from the Internet URL: http://clair.si.umich.edu/~radev/papers/Radev-et-al.pdf; 22 pages.

* cited by examiner

*Primary Examiner* — Cam-Linh Nguyen
(74) *Attorney, Agent, or Firm* — Fish & Richardson P.C.

(57) ABSTRACT

Methods, systems, and apparatus, including computer programs encoded on a computer storage medium, for determining whether to provide a factual answer to a user's query. In one aspect, a method includes obtaining a set of query patterns associated with a particular fact. A subset of natural language query patterns can be identified from the set of query patterns. A likelihood that a query corresponding to at least one of the query patterns from the set of query patterns is a fact-seeking query can be determined based at least in part on comparing a first query count associated with the subset of natural language query patterns with a second query count associated with the set of query patterns. The likelihood can be provided as a signal for ranking search results.

18 Claims, 4 Drawing Sheets

SEARCH RANKING BASED ON NATURAL LANGUAGE QUERY PATTERNS

BACKGROUND

The Internet provides access to a wide variety of resources such as video or audio files, web pages for particular subjects, book articles, or news articles. A search system can identify resources in response to a search query, rank the resources, and provide search results that link to the resources based on the ranking. Users of search systems are often searching for data related to a particular piece of information, such as a fact.

SUMMARY

The subject matter described in this specification can include determining whether to provide a factual answer to a user's query based at least in part on a likelihood that the user is seeking a factual answer. This likelihood may be based on a natural language ratio, which relates to how often a query related to a particular fact is expressed in natural language versus how often the query is not expressed in a natural language. The answer may be presented in a structured search result on a search results page that includes other search results. For example, in response to a search for a famous celebrity's height, a structured search result that identifies the celebrity's height may be presented at the top of a search results page. Search results may also be presented below the structured result.

In general, one aspect of the subject matter includes the actions of obtaining a set of query patterns associated with a particular fact; identifying a subset of natural language query patterns from the set of query patterns; determining a likelihood that a query corresponding to at least one of the query patterns from the set of query patterns is a fact-seeking query based at least in part on comparing a first query count associated with the subset of natural language query patterns with a second query count associated with the set of query patterns; and providing the likelihood as a signal for ranking search results.

Some implementations can involve obtaining the first query count and the second query count from query logs. In some implementations, the first query count and the second query count correspond to counts of voice queries. In some implementations, the first query count and the second query count correspond to counts of textual queries.

In some implementations, identifying a subset of natural language query patterns from the set of query patterns includes, for each query pattern in the set of query patterns, determining a likelihood that the respective query pattern corresponds to a natural language query pattern; and selecting the respective query pattern when the likelihood satisfies a threshold. In some implementations, obtaining a set of query patterns associated with a particular fact includes obtaining fact-seeking queries; determining that a set of the fact-seeking queries relate to the particular fact; and generating the set of query patterns from the set of the fact-seeking queries that relate to the particular fact.

In some aspects, the likelihood corresponds to a ratio of the first query count associated with the subset of natural language query patterns over the second query count associated with the set of query patterns. In some implementations, the first query count is based on a number of queries stored in a query log that are related to the particular fact and that are classified as having a natural language query form. In some implementations, each natural language query pattern includes a query pattern that is classified as having a form in which a user would phrase a question when speaking to another person.

Another aspect of the subject matter includes the actions of receiving a query; determining a particular fact associated with the query; based on the particular fact, obtaining a likelihood that the query is a fact-seeking query, where the likelihood is based at least in part on comparing a first query count associated with a set of query patterns with a second query count associated with a subset of natural language query patterns selected from the set of query patterns; based on determining that the likelihood satisfies a threshold, adding a factual answer to a set of search results for the query; and providing the set of search results in response to the query.

In some implementations, the set of query patterns and the subset of natural language query patterns are associated with queries identified as being related to the particular fact. In some implementations, the factual answer specifies the particular fact.

Some implementations involve ranking the factual answer with the search results using the likelihood and ranking scores for each of the search results. In some aspects, the search results and the factual answer are ordered according to the ranking.

In some implementations, the query includes a voice query; the first query count and the second query count correspond to counts of voice queries; and the threshold corresponds to voice-based queries. In some implementations, the query includes a textual query; the first query count and the second query count correspond to counts of textual queries; and the threshold corresponds to textual queries.

In some aspects, each natural language query pattern includes a query pattern that is classified as having a form in which a user would phrase a question when speaking to another person.

Implementations described in this specification may realize one or more of the following advantages. In some implementations, a factual answer is provided in response to queries that are identified as being fact-seeking. Queries that correspond to a particular fact are more accurately identified as being fact-seeking based on query patterns associated with the particular fact. A comparison between a query count associated with natural language queries for a particular fact and total query count for the particular fact can be used to more accurately determine whether queries related to the particular fact are fact-seeking queries. Factual answers can be ranked with search results identified for a query and presented with the search results based on the ranking.

The details of the subject matter described in this specification are set forth in the accompanying drawings and the description below. Other features, aspects, and advantages of the subject matter will become apparent from the description, the drawings, and the claims.

DETAILED DESCRIPTION

Figure 1:
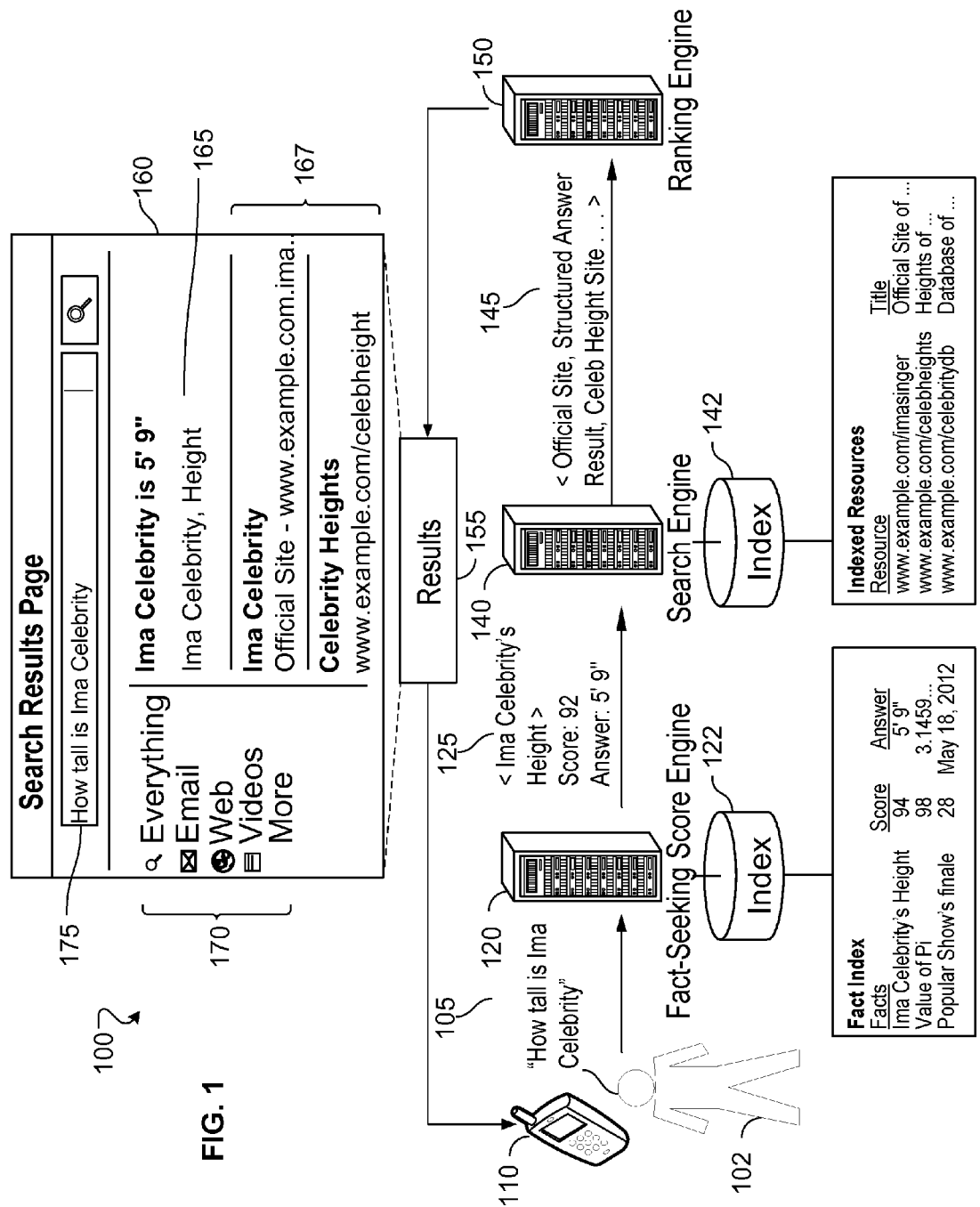
FIG. 1 is a diagram of an example system that provides factual answers in response to queries that are determined to be fact-seeking queries.

When a user submits a query that includes a question, or is determined to be related to a question, a search system may provide an answer to the question. For example, if a user submits a query, "How tall is Ima Celebrity," the search system may provide the height of Ima Celebrity. The answer may be presented as a structured search result at the top of a search results page. As described in more detail below, the answer may be presented in other areas of the search results page, such as to one side of the page or interposed between search results.

When searching for an answer to a question or for a particular fact, many users express their query using natural language, such as "what is the time zone for North Dakota." In general, a natural language query is one in a form in which a user may phrase the question when speaking to another person. Other users may search for the same fact by entering a non-natural language query, such as "time zone North Dakota." This would likely seem awkward if spoken to another person. In general, a non-natural language question is one that is not in a form in which a user would phrase the question when speaking to another user. Natural language query patterns can be a strong indication that a user is searching for a particular fact or another piece of information.

The search system can determine whether to provide an answer in response to queries that are related to a particular fact (or another piece of information) based on the patterns of queries for the particular fact that have been received by the search system. For example, if queries for a particular fact are often submitted using a natural language query pattern, the search system may provide a factual answer that includes the particular fact in response to queries (e.g., queries having a natural language pattern or a non-natural language pattern) that are related to the particular fact. Consider, for example, the query, "value of pi." If users often search for the value of pi using natural language query patterns, such as "what is the value of pi," the search system may provide a factual answer that includes the value of pi in response to queries that are determined to be related to the value of pi, such as "pi value." Conversely, queries related to a particular event (e.g., first moon landing) may be submitted infrequently using natural language patterns. In this example, the search system may determine to not provide a factual answer in response to queries related to the first moon landing as, for example, there may be many facts related to the particular event.

The search system can determine a fact-seeking score for facts (or queries related to the facts) and use the fact-seeking scores to determine whether to provide a factual answer in response to a query that is related to the facts. The fact-seeking score for a particular fact may be based on a number of queries received by the search system that are related to the particular fact and that are classified as having a natural language query pattern. The fact-seeking score for the particular fact may also be based on a total number of queries received by the search system that are related to the particular fact. For example, the fact-seeking score for the particular fact may be based on a ratio between the number of natural language pattern queries for the particular fact and the total number of queries for the particular fact. The search system may provide a factual answer in response to queries that are related to facts having a sufficient fact-seeking score, such as a fact-seeking score that meets or exceeds a particular threshold.

FIG. 1 is a diagram of an example system 100 that provides factual answers in response to queries that are determined to be fact-seeking queries. For example, a query may be determined to be a fact-seeking query in response to determining that the query is related to a fact that has a fact-seeking score that satisfies a threshold. The fact-seeking score for a particular fact can be indicative of a likelihood that queries related to the fact are fact-seeking queries. For example, queries that are related to facts that have a high fact-seeking score (e.g., greater than a threshold score) may be considered as likely to be fact-seeking, while queries that are related to facts that have a low fact-seeking score (e.g., less than the threshold score) may not be considered to be fact-seeking.

The system 100 includes a client device 110, a fact-seeking score engine 120, a search engine 140, and a ranking engine 150. Fact-seeking score engine 120, search engine 140, and ranking engine 150 may be computing devices that take the form of a number of different devices, for example, a standard server, a group of such servers, or a rack server system. In addition, fact-seeking score engine 120, search engine 140, and ranking engine 150 may be implemented in a personal computer, for example, a laptop computer.

The client device 110 may include one or more processing devices, and may be, or include, a mobile telephone (e.g., a smartphone), a laptop computer, a handheld computer, a tablet computer, a network appliance, a camera, a media player, a wearable computer, a navigation device, an e-mail device, a game console, an interactive television, or a combination of any two or more of these data processing devices or other data processing devices.

As shown in FIG. 1, a user 102 initiates a query 105 using the client device 110. The user 102 may format the query 105 as a natural language question or a non-natural language query. In this example, the user 102 has formatted the query 105 as a natural language question, "How tall is Ima Celebrity." Another user may search for the height of Ima Celebrity using a non-natural query, such as "Ima Celebrity height."

The user 102 may initiate the query 105 by typing a textual query into a search box of a search page. In some implementations, the user may interact with the client device 110 using a voice-based dialog system. For example, the user 102 may say "How tall is Ima Celebrity" into a microphone of the client device 110. The client device 110 may then perform speech recognition to convert the utterance into a transcription, and then transmit the transcription to the fact-seeking score engine 120. In some implementations, the client device 110 may transmit audio speech data encoding the utterance.

The fact-seeking score engine 120 receives the query 105 from the client device 110. The fact-seeking score engine 120 may include one or more processors, an operating system and one or more computer memories. The fact-seeking score engine 120 may include modules, stored in memory or an external storage device and loaded into memory that enable the fact-seeking score engine 120 to determine whether queries are related to facts and determine fact-seeking scores for facts.

The fact-seeking score engine 120 can determine whether the query 105 is related to particular fact and, if so, identify a fact-seeking score for the related fact. The fact-seeking score engine 120 may include a natural language processing (NLP) engine that parses and translates the query 105 into a query expression language (e.g., a structured query language (SQL) or Google query language (GQL)). The fact-seeking score engine 120 may then compare the formatted query to a fact index 122 to determine whether the query is related to a particular fact that is included in the fact index 122.

The fact index 122 is an index of known facts, such as facts related to individuals, places, organizations, groups, objects, products, or other things. For example, the fact index 122 includes Ima Celebrity's height, the value of pi, and Popular Show's finale. The facts index 122 also includes, for each fact, a fact-seeking score for the fact and an answer (or value) that can be provided in response to queries related to the fact. Of course, the fact index 122 can include other information related to the fact that may or may not be provided for display with the factual answer. The fact-seeking score index 122 can compare the formatted query to the facts in the fact index 124 to determine whether the query 105 is related to one of the indexed facts. In this example, the fact-seeking score engine 120 has determined that the query 105 is related to the fact, "Ima Celebrity's Height," which has a fact-seeking score of 94 and a factual answer of 5'9".

The fact-seeking score engine 120 can also determine the fact-seeking scores for each fact included in the facts index 122. As described in more detail below, the fact-seeking score engine 120 can determine the fact-seeking score for a particular fact based on a number of natural language queries received by the fact-seeking score engine 120 that are related to the particular fact and a total number of queries received by the fact-seeking score engine 120 that are related to the particular fact.

In response to determining that the query 105 is related to a fact, the fact-seeking score engine 120 can provide data 125 that specifies the fact, the fact-seeking score for the fact, and/or the factual answer for the fact to the search engine 140. The fact-seeking score engine 120 can also provide the query 105 and/or the formatted query to the search engine 140. The fact-seeking score engine 120 may provide the query 105 or the formatted query to the search engine 140 irrespective of whether the fact-seeking score engine 120 has determined that the query 105 is related to a fact included in the fact index 122. For example, if the fact-seeking score engine 120 determined that the query 105 is not related to a fact included in the fact index 122, the fact-seeking score index 120 may provide the query 105 or the formatted query to the search engine without data specifying a fact.

In some implementations, the fact-seeking score engine 120 may only provide data specifying a fact if the identified fact has a corresponding fact-seeking score that satisfies (e.g., meets or exceeds) a threshold. For example, the fact-seeking engine 120 may determine whether to provide a factual answer in response to the query 105 based on the fact-seeking score for the identified fact. If the fact-seeking score fails to meet the threshold, the fact-seeking score engine 120 may determine that a factual answer should not be provided and, in response, determine to not provide data specifying the fact to the search engine 140. In some implementations, the determination of whether to provide a factual answer to the query 105 is made by the ranking engine 150, as described below.

The search engine 140 can receive the data 125 and/or the query 105 (or its formatted version) from the fact-seeking score index 120. The search engine 140 may include one or more processors, an operating system and one or more computer memories. The search engine 140 may include modules, stored in memory or an external storage device and loaded into memory that enable the search engine 140 to identify resources that are relevant to queries and to generate search results that reference the resources.

The search engine 140 can interact with a search index 142 to identify resources that are relevant to the query 105. A resource is data that can be provided over a network and that is associated with a resource address, e.g., a uniform resource locator. Resources that can be provided by a web site include HTML pages, word processing documents, portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts.

To facilitate searching of resources, the search system 140 identifies the resources by crawling and indexing the resources provided on web sites in the search index 142. Data about the resources can be indexed based on the resource to which the data corresponds.

The search engine 140 identifies resource relevant to the query 105, generates search results that identify the resources, and provides the search results to a ranking engine 150. A search result is data generated by the search engine 140 that identifies a resource that is responsive to a particular search query, and includes a link to the resource. An example search result can include a web page title, a snippet of text or a portion of an image extracted from the web page, and the URL of the web page. In this example, the search engine 140 has identified, as search results 167, an official site for Ima Celebrity and a site directed to the heights of celebrities.

The search engine 140 can also generate a structured search result for a factual answer identified by the fact-seeking score engine 122. A structured search result for a factual answer may include the factual answer to the query 105 and information identifying the answer. In the example, a structured search result 165 includes a factual answer of 5'9" and information identifying that the factual answer is Ima Celebrity's height. For voice queries, the search engine 140 may generate an audio version of the answer.

The search engine 140 can provide data 145 that includes the identified search results 167 and/or the structured search result 165 to the ranking engine 150. The ranking engine 150 may include one or more processors, an operating system and one or more computer memories. The ranking engine 150 may include modules, stored in memory or an external storage device and loaded into memory that enable the ranking engine 150 to receive and rank search results 167.

The ranking engine 150 may rank the search results 167 based on scores related to the resources identified by the search results 167, such as information retrieval (IR) scores, and optionally a separate ranking of each resource relative to other resources (e.g., an authority score). In some implementations, the ranking engine 150 may rank the structured search result 165 with the search results 167. For example, the ranking engine 150 may determine a ranking score for the structured search result 165 that is based on the fact-seeking score for the particular fact referenced by the structured result 165.

The ranking score may be a normalized version of the fact-seeking-score for the particular fact such that the structured search result can be ranked with the search results 167 using the ranking score for the structured search result and the scores for the search results 167. For example, the ranking score for the structured search result may be scaled using a normalization factor. The normalization factor may be specified by a user, or learned using data regarding fact-seeking scores for a set of facts.

The ranking engine 150 can provide results 155 that include the search results 167 and the structured search result 165 to the client device 110. The ranking engine 150 may also provide to the client device 110 data specifying the ranking or the order in which the search results 167 and the structured search result 165 should be rendered on the client device 110.

In some implementations, the structured search result 165 that includes the factual answer may also be ranked with other types of structured search results. For example, the structured search result 165 may be ranked with a structured information result that includes general information about Ima Celebrity. This information may include, for example, information regarding movies that included Ima Celebrity, biographic information about Ima Celebrity, or other information.

As shown in FIG. 1, the results 155 may be included in a search results page 160 that includes the structured search result 165 and the search results 167. In this example, the structured search result 165 is displayed above the search results 167. The ranking engine 150 may specify that structured search results 165 that include a factual answer be presented in a particular location, such as the top of the search results page 160 (e.g., to prominently display the factual answer to the user 102), to one side of the search results page 160, or at the bottom of the search results page 160. In implementations where the structured search result 165 is ranked along with the search results 167, the structured search result 165 may be presented between two search results 165. For example, if the ranking engine 150 ranked the structured search result 165 lower than the official site for Ima Celebrity, but higher than the celebrity heights web site, the structure search result 165 may be displayed between the two search results 167.

In some implementations, the factual answer may be provided in audio form, for example, in response to a voice query. For example, an audio-based factual answer may be provided in response to a voice query in response to the voice query being related to a particular fact that has a fact-seeking score that meets a threshold.

The search results page 160 includes a set of icons 170 that may allow the user 102 to filter the search results, for example to e-mails, web pages, video, etc. The search results page 160 also includes a search box 175 that shows the original query 105, i.e., "How tall is Ima Celebrity."

Figure 2:
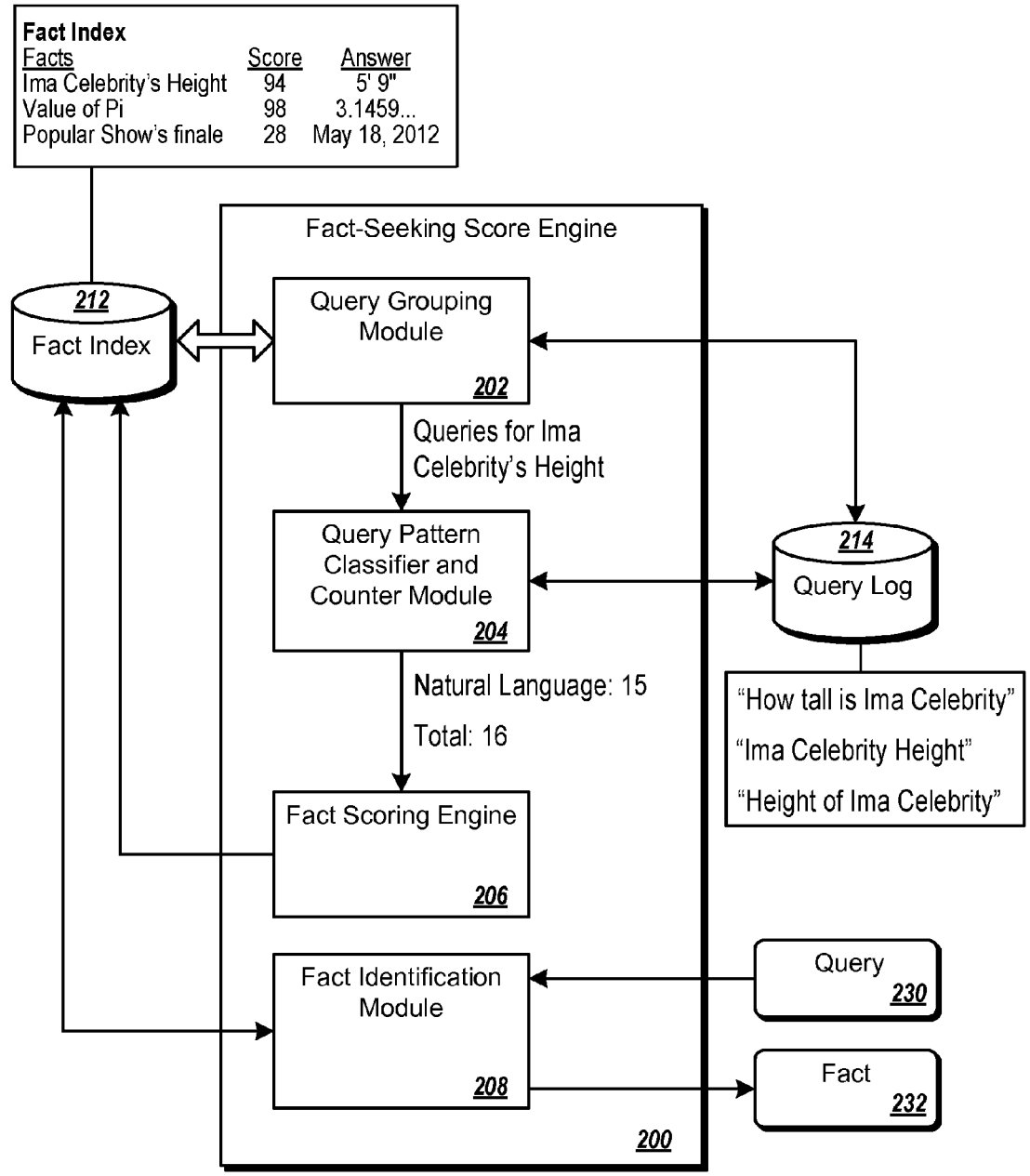
FIG. 2 is a diagram of an example fact-seeking score engine.

FIG. 2 is a diagram of an example fact-seeking score engine 200. Fact-seeking score engine 200 may correspond to, for instance, some or all of the functional components of fact-seeking score engine 120 of FIG. 1. The fact-seeking score engine 200 may include a query grouping module 202, a query pattern classifier and counter module 204, a fact scoring module 206, and a fact identification module 208. Any, or all of modules 202, 204, 206, and 208 may be implemented by one or memory devices and/or one or more processors. Furthermore, multiple modules may be associated with the same memory device and/or processor.

The query grouping module 202 can identify queries related to a set of facts and group the queries based on the fact to which the queries are related. The fact query grouping module 202 can interact with a query log 214 to identify queries that are related to, or associated with, each fact of a set of facts. The query log 214 may store data identifying queries received by the fact-seeking score engine 200 or a search system. The query log 214 may also store, for each query, data specifying whether the query has resulted in a factual answer being provided for the query and, if so, which fact(s) were identified in the factual answer(s) provided in response to the query.

In some implementations, the fact query grouping module 202 can use discourse context data to identify queries related to a particular fact. For example, the fact query grouping module 202 may identify queries that include a pronoun and associate the query with a fact related to an entity referenced by the pronoun using context data. Consider, for example, the query "how tall is he." If this query follows the query "what movies have Ima Celebrity starred in," the fact query grouping module 202 may determine that "he" in the query "how tall is he" refers to Ima Celebrity. The query "how tall is he" may then be associated with the fact "Ima Celebrity Height."

The fact query grouping module 202 can group or join the queries based on the facts to which the queries are related (or the facts to which the queries are seeking). For example, the fact query grouping module 202 may generate a set of queries that includes each of the queries that are related to Ima Celebrity's height. As shown in FIG. 2, this set of queries may include the queries "How tall is Ima Celebrity," "Ima Celebrity's Height," and "Height of Ima Celebrity." Similarly, each of the queries that are determined to be seeking the value of pi may be grouped together into a set of queries.

In some implementations, the fact query grouping module 202 identifies the fact to which a particular query is related based on previous factual answers provided in response to the query. For example, a particular fact has been provided as a factual answer in response to a particular query, the particular query may be identified as being associated with the particular fact and included in a set of queries for the particular fact. In some implementations, the set of queries for a particular fact include only those queries that previously resulted in a factual answer being provided in response to the query.

In some implementations, the fact query grouping module 202 may determine that a particular query is related to a particular fact in response to determining that he particular query includes a reference to the fact. For example, the query "Height of Ima Celebrity" includes a reference to height and a reference to "Ima Celebrity." Based on these references, the fact query grouping module 202 may determine that the query is related to the fact, "Ima Celebrity's Height."

The fact query grouping module 202 can provide data specifying the set of queries for each fact to the query pattern classifier and counter module 204. The query pattern classifier and counter module 204 can identify the different forms or patterns of queries used for each fact and identify whether each query pattern is a natural language query pattern or a non-natural language query pattern. Continuing the Ima Celebrity example, the query pattern classifier and counter module 204 may identify the query pattern, "How tall is Ima Celebrity," as having a natural language query pattern. The query pattern classifier and counter module 204 may also identify the query pattern, "Height of Ima Celebrity," as being a non-natural language query pattern.

In some implementations, the query patterns for each fact are classified manually. For example, individuals may review query patterns and provide a classification of natural language query pattern or non-natural language pattern for each reviewed query pattern. Individuals may also generate natural language query patterns. For example, an individual may generate a query pattern of "How tall is [ ]" and classify the query pattern as a natural-language query pattern. The query pattern classifier and counter module 204 can then compare the generated query pattern to the query patterns for the facts. Query patterns that match the generated query pattern may be classified as having a natural language query pattern. A similar process can be performed for non-natural language patterns using generated non-natural query patterns.

The query pattern classifier and counter module 204 may include a classifier that automatically classifies query patterns as having a natural language query pattern or a non-natural language query pattern. The classifier may classify a query pattern based on, for example, the length of the query pattern and/or the number of times the query pattern appears in a document or a corpus of documents. For example, longer query patterns (e.g., query patterns having at least a threshold length of characters) may be classified as being a natural language query pattern, while shorter query patterns (e.g., query patterns having less than the threshold length of characters) may be classified as having a non-natural language query pattern. In addition, query patterns that appear frequently (e.g., at least a threshold number of occurrences) in a document or a corpus of documents (e.g., a corpus of documents including natural language text) may be classified as being a natural language query pattern, while queries that appear infrequently (e.g., less than the threshold number of occurrences) in the document or corpus may be classified as being a non-natural language pattern.

The query pattern classifier and counter module 204 can use the classifications to identify a subset of the query patterns for each fact. The subset of query patterns for a particular fact may include the query patterns that are classified as having a natural language pattern.

The query pattern classifier and counter module 204 can also determine a natural language query count and a total query count for each fact. The natural language query count for a particular fact, also referred to herein as a first query count, can be based on the number of received queries related to the particular fact that have a query pattern classified as a natural language query pattern. For example, consider that the queries "How tall is Ima Celebrity" and "What is Ima Celebrity's height" have each been classified as having a natural language query pattern. If the query "How tall is Ima Celebrity" has been received ten times and the query "What is Ima Celebrity's height" has been received five times, the fact "Ima Celebrity's Height" may have a natural language query count of fifteen, assuming no other natural language queries have been received for this fact. The total query count, also referred to herein as a second query count, for a particular fact can be based on the total number of received queries that are related to the particular fact, irrespective of the queries' classification. In some implementations, the natural language count and/or the total query count is stored in the query log 214.

The query pattern classifier and counter module 204 can provide data that specifies, for each fact, the natural language query count and the total query count for the fact to the fact scoring engine 206. The fact scoring engine 206 can determine a fact-seeking score for each fact based on the natural language query count and the total query count for the fact. The fact-seeking score for a particular fact may be based on a comparison of the natural language query count and the total query count for the particular query. For example, the fact-seeking score for a particular fact may be equal to, or proportional to, a ratio between the natural language query count for the particular fact and the total query count for the particular fact.

The query pattern classifier and counter module 204 can store the fact-seeking score for each fact in the fact index 212 with a reference to the fact. For example, a fact-seeking score of 94 has been stored in the fact index with a reference to the fact "Ima Celebrity's Height."

The fact identification module 208 can receive queries 230 and determine whether the received queries are related to a fact. For example, the fact identification module 208 can access the fact index 212 to determine whether a received query is related to a fact stored in the fact index 212. If the received query is related to a fact, the fact identification module 208 can obtain the fact-seeking score for the fact from the fact index 212 and provide data 232 specifying the fact and the fact-seeking score for the fact as a signal for ranking search results. For example, the fact identification module 208 may provide the data 232 to a search engine and/or a ranking engine for use in triggering a structured search result for the fact and/or ranking the structured search result with other search results relevant to the received query.

In some implementations, the fact-seeking score engine 200 may account for differences between textual queries and voice queries as voice queries tend to have a natural language pattern more often than textual queries. To account for the differences, each fact may have an associated fact-seeking score for textual queries and another fact-seeking score for voice queries. The fact-seeking score for textual queries may be based on the classification of queries related to the fact that were provided in textual form. A natural language query count may be determined for the fact based on the number of received textual queries that are related to the fact and that are classified as having a natural language query form. A total query count may also be determined for the fact based on the total number of received textual queries that are related to the fact. The fact-seeking score for the fact's textual queries may be determined based on a comparison of this natural language query count and this total query count. For example, the fact-seeking score for the fact's textual queries may be equal to, or proportional to the natural language query count and the total query count. A fact-seeking score for the fact's voice queries can be determined in a similar manner using counts for received voice queries that are related to the fact.

To determine whether to provide a factual answer in response to a textual query that is related to a fact, the fact-seeking score for the fact's textual queries may be compared to a threshold for text queries. If the fact-seeking score for the fact's textual queries satisfies the threshold for text queries (e.g., by meeting or exceeding the threshold), a factual answer may be provided in response to the textual query. Similarly, to determine whether to provide a factual answer in response to a voice query that is related to the fact, the fact-seeking score for the fact's voice queries may be compared to a threshold for voice queries. If the fact-seeking score for the fact's voice queries satisfies the threshold for voice queries (e.g., by meeting or exceeding the threshold), a factual answer may be provided in response to the voice query. In some implementations, the threshold for voice queries may be higher than the threshold for text queries as voice queries tend to be in a natural language pattern more often than textual queries.

In a similar manner, the fact-seeking score engine 200 may account for differences between types of devices, spoken languages, countries from which queries are received, or other data related to the queries. For example, a fact-seeking score may be determined for a particular fact for each of a set of different types of devices (e.g., a score for laptop computers, a score for tablet computers, and/or a score for mobile phones). In response to receiving a query related to a particular fact and from a particular type of device, the fact-seeking score for the particular fact with respect to the particular type of device can be compared to a threshold score for the particular type of device to determine whether to provide an answer in response to the query.

Figure 3:
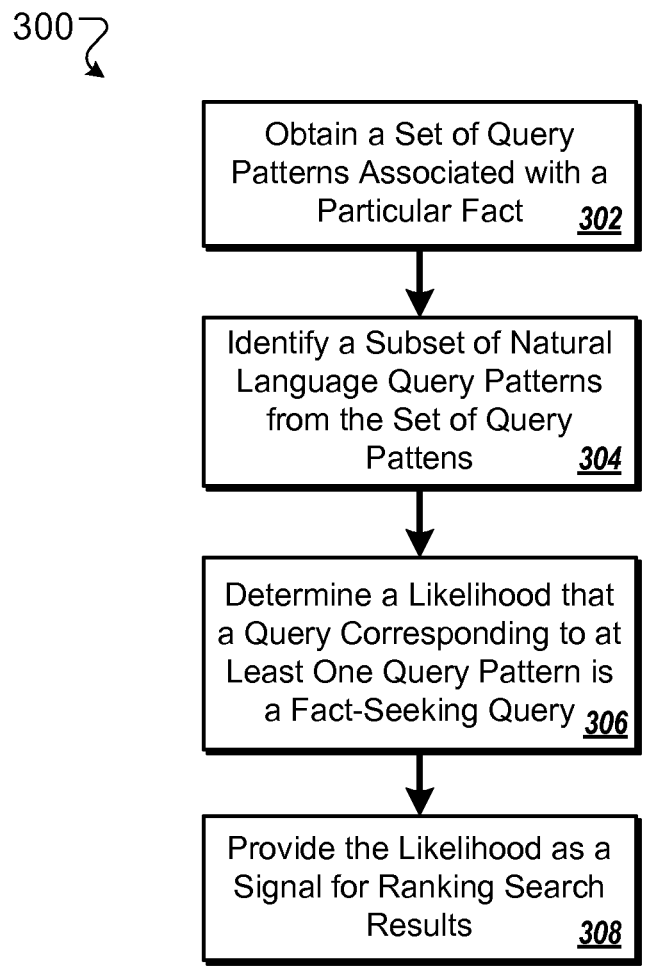
FIG. 3 is a flowchart of an example process for determining a fact-seeking score for a query and providing the fact-seeking score as a signal for ranking search results.

FIG. 3 is a flowchart of an example process 300 for determining a fact-seeking score for a query and providing the fact-seeking score as a signal for ranking search results. For example purposes, the process 300 will be described as being performed by a server. This server may include one or more servers that perform the functions of the fact-seeking score engine 120, the search engine 140, and/or the ranking engine 150 as described with reference to FIGS. 1 and 2 above.

A set of query patterns associated with a particular fact are obtained (302). For example, the server may obtain queries that are associated with, or related to, the particular fact from a query log. As described above, a query may be associated with a particular fact if the query references the particular fact or if the particular fact was provided as a factual answer in response to the query.

The server may identify a set of query patterns associated with the fact based on the set of queries. The queries used to search for a particular fact can be formed in multiple different patterns. For example, the queries "value of pi" and "pi value" are two different query patterns used to search for the value of pi. The server can identify, for inclusion in the set of query patterns, the query pattern of each query included in the set of queries for the particular fact.

A subset of natural language query patterns are identified from the set of query patterns (304). For example, the server may identify a classification for each query pattern included in the set of query patterns. The classification may indicate whether the query pattern is a natural language query pattern or a non-natural language query pattern. As described above, a query pattern may be classified manually or automatically using a classifier, for example. The server can identify the subset of natural language query patterns using the classifications for the query patterns included in the set of query patterns.

A likelihood that a query corresponding to at least one query pattern of the set of query patterns is a fact seeking query is determined (306). For example, the likelihood may correspond to a fact-seeking score for the particular fact. The fact-seeking score for the particular fact can indicate a likelihood that queries associated with the particular fact are fact-seeking queries.

The fact seeking score for the particular fact may be determined by comparing a natural language query count for the particular fact to a total query count for the particular fact, as described above. For example, the fact-seeking score for the particular fact may be based on a ratio between the natural language query count and the total query count. The fact-seeking score for the particular fact may be equal to, or proportional to, the ratio. The server can assign the fact-seeking score for the particular fact to each query that is determined to be associated with, or related to, the particular fact.

The likelihood is provided as a signal for ranking search results (308). In some implementations, the likelihood for a query pattern can be used to determine whether to provide a factual answer in response to a query having the query pattern. For example, the server may determine to provide a factual answer to the query in response to the likelihood satisfying (e.g., meeting or exceeding) a threshold. If the likelihood fails to satisfy the threshold, the server may determine to not provide a factual answer in response to the query.

The likelihood can also be used to rank a structured search result that includes the factual answer with other search results. For example, the likelihood can be normalized or otherwise adjusted such that the likelihood can be compared to ranking scores for search results. The structured search result can be presented in a listing of search results based on the scores. For example, the structured search result may be presented as the third search result if the likelihood for the query is the third highest score compared to the ranking scores of the search results.

Figure 4:
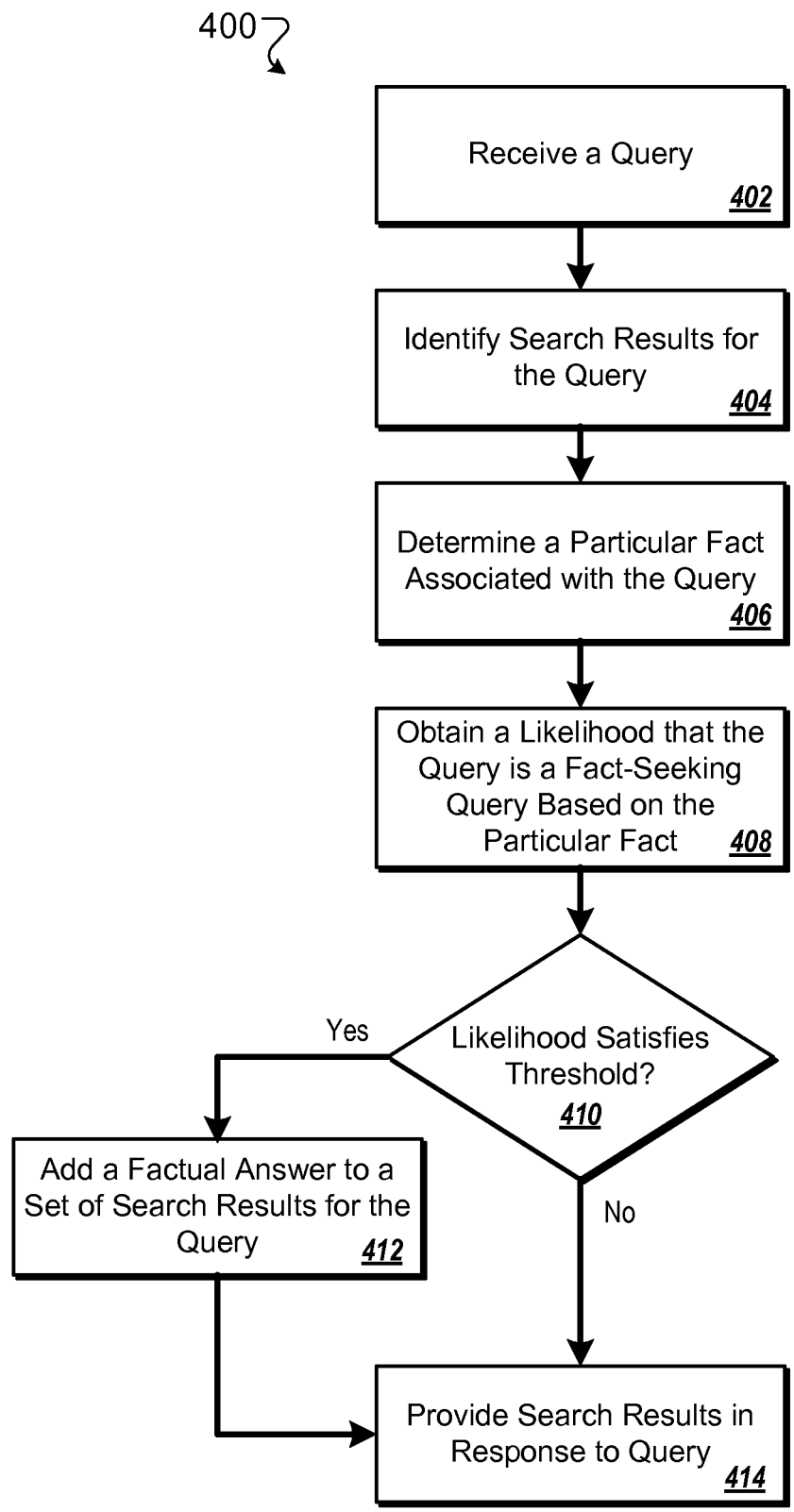
FIG. 4 is a flowchart of an example process for providing search results in response to a query.

FIG. 4 is a flowchart of an example process 400 for providing search results in response to a query. For example purposes, the process 400 will be described as being performed by a server. This server may include one or more servers that perform the functions of the fact-seeking score engine 120, the search engine 140, and/or the ranking engine 150 as described with reference to FIGS. 1 and 2 above.

A query is received (402). For example, a user may submit a textual query or a voice query using a client device. If the query is a voice query, speech recognition can be performed to convert the utterance into a transcription.

Search results are identified for the query (404). For example, the server may access a search index to identify resources that are relevant to the query. The server may generate a search result for each identified resource. The server can also identify a ranking score for each search result using an IR score, authority score, or other score for the resource referenced by the search result.

A particular fact associated with the query is determined (406). The server may determine that the query is associated with the particular fact in response to determining that the query includes a reference to the particular fact. For example, the server may compare the query to a set of facts included in a fact index and, if the query matches a particular fact in the fact index, determine that the query is associated with, or related to, the particular fact.

In some implementations, the server may determine that the query is associated with a particular fact in response to determining that a factual answer that included the particular fact was provided in response to a previous query that matches or that is similar to the query. For example, if a factual answer of "3.14" was previously provided for a query "value of pi," the serve may determine that the query "value of pi" is associated with, or related to, the factual answer "3.14."

A likelihood that the query is a fact-seeking query is obtained based on the particular fact (408). For example, the server may obtain a fact-seeking score for the particular fact that is associated with the query. The likelihood may be based on the fact-seeking score for the particular fact. For example, the likelihood may be equal to, or proportional to, the fact-seeking score for the particular fact. As described above, the fact-seeking score for a particular fact can be based on a comparison between a natural language query count for the particular fact and a total query count for the particular fact.

In some implementations, the server may determine that the received query is related to the particular fact based on the query including a reference to the particular fact. In response, the server may consider the fact-seeking score for the particular fact to be indicative of a likelihood that the query is a fact-seeking query.

A determination is made whether the likelihood for the query satisfies a threshold (410). For example, the server may compare the likelihood to the threshold and determine that the likelihood satisfies the threshold if the likelihood exceeds the threshold.

If the likelihood satisfies the threshold, a factual answer is added to the search results (412). The factual answer can provide an answer to the received query and may include the particular fact that is related to the query. For example, the factual answer may be in the form of a structured search result that identifies the particular fact.

The search results are provided in response to the query (414). For example, the server may provide the search results for display by a client device from which the query was received. If the likelihood did not satisfy the threshold, the search results may be provided without a factual answer. If the likelihood satisfied the threshold, the search results may be provided with the factual answer. For example, the factual answer may be displayed at the top of a search results page, at one side of the search results page, or between two search results.

Although the examples above are described in terms of fact-seeking scores for facts (or queries related to the facts), the systems and processes described above can be used to determine fact-seeking scores for attributes. For example, a fact-seeking score may be determined for the attribute "person height" based on the fact-seeking scores for each fact that is related to a person's height. By way of another example, a fact-seeking score may be determined for the attribute "heights," which may also include the heights of objects, e.g., heights of roller coasters, buildings, etc. The fact-seeking score for an attribute may be the average, mean, median, or another measure of central tendency of the fact-seeking scores for facts related to the attribute. When a query is received that is determined to be related to a particular attribute, the fact-seeking score for the particular attribute may be used to determine whether to provide an answer in response to the query and/or to rank an answer to the query with search results responsive to the query.

Fact-seeking scores that have been determined based on queries that are of a particular language can be used to score queries of another language. For example, a fact-seeking score may be determined for a particular fact or a particular attribute using English language queries that are associated with the particular fact or the particular attribute, as described above. The fact-seeking score for the particular fact or the particular attribute can then be used to determine whether to provide an answer to a query in a different language (e.g., Spanish) that is directed to the particular fact or the particular attribute.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    obtaining, by a search engine, a set of query patterns that are associated with searching for a particular fact, the set of query patterns including a first subset of one or more query patterns that are expressed in a natural language format, and a second subset of one or more query patterns that are not expressed in a natural language format;
    determining, by the search engine, (i) a first quantity of query patterns that occur in the set of query patterns that are associated with searching for the particular fact, and (ii) a second quantity of query patterns that occur in the first subset of query patterns that are expressed in a natural language format;
    determining, by the search engine, a likelihood that a particular query is a fact-seeking query based at least on comparing the first quantity and the second quantity, wherein a fact-seeking query is a query for which a factual answer is presented adjacent to one or more search results, in an answer area of a search results page that is generated in response to the query; and
    using, by the search engine, the likelihood as a signal for ranking search results.

2. The method of claim 1, wherein the first quantity and the second quantity correspond to counts of voice queries.

3. The method of claim 1, wherein the first quantity and the second quantity correspond to counts of textual queries.

4. The method of claim 1, further comprising identifying the first subset of query patterns that are expressed in a natural language format, including:
    for each query pattern in the set of query patterns, determining a likelihood that the respective query pattern corresponds to a natural language query pattern; and
    selecting the respective query pattern when the likelihood that the respective query pattern corresponds to a natural language query pattern satisfies a threshold.

5. The method of claim 1, wherein obtaining a set of query patterns that are associated with searching for a particular fact comprises:
    obtaining a plurality of fact-seeking queries;
    determining that a set of the fact-seeking queries relate to the particular fact; and
    generating the set of query patterns from the set of the fact-seeking queries that relate to the particular fact.

6. The method of claim 1, wherein the likelihood corresponds to a ratio of the first quantity over the second quantity.

7. The method of claim 1, wherein the first quantity is based on a number of queries stored in a query log that are related to the particular fact and that are classified as having a natural language format.

8. The method of claim 1, wherein each query pattern that is expressed in a natural language format comprises a query pattern that is classified as having a form in which a user would phrase a question when speaking to another person.

9. A computer-implemented method comprising:
receiving, at a search engine and from a client device, a query;
determining, by the search engine, a particular fact associated with the received query;
based on the particular fact, obtaining a likelihood that the received query is a fact-seeking query, wherein the likelihood is based at least on comparing (i) a first quantity of query patterns that occur in a set of query patterns that are associated with searching for the particular fact with (ii) a second quantity of query patterns that occur in a first subset of the set of query patterns, the first subset of the set of query patterns including one or more query patterns that are expressed in a natural language format;
based on determining that the likelihood satisfies a threshold, adding, by the search engine, a factual answer to a set of search results for the query; and
providing, by the search engine and to the client device, the set of search results in response to the query.

10. The method of claim 9, wherein the factual answer specifies the particular fact.

11. The method of claim 9, further comprising ranking the factual answer with the search results using the likelihood and ranking scores for each of the search results, wherein the search results and the factual answer are ordered according to the ranking.

12. The method of claim 9, wherein:
the received query comprises a voice query;
the first quantity and the second quantity correspond to counts of voice queries; and
the threshold corresponds to voice-based queries.

13. The method of claim 9, wherein:
the received query comprises a textual query;
the first quantity and the second quantity correspond to counts of textual queries; and
the threshold corresponds to textual queries.

14. The method of claim 9, wherein each query pattern that is expressed in a natural language format comprises a query pattern that is classified as having a form in which a user would phrase a question when speaking to another person.

15. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
obtaining, by a search engine, a set of query patterns that are associated with searching for a particular fact, the set of query patterns including a first subset of one or more query patterns that are expressed in a natural language format, and a second subset of one or more query patterns that are not expressed in a natural language format;
determining, by the search engine, (i) a first quantity of query patterns that occur in the set of query patterns that are associated with searching for the particular fact, and (ii) a second quantity of query patterns that occur in the first subset of query patterns that are expressed in a natural language format;
determining, by the search engine, a likelihood that a particular query is a fact-seeking query based at least on comparing the first quantity and the second quantity, wherein a fact-seeking query is a query for which a factual answer is presented adjacent to one or more search results, in an answer area of a search results page that is generated in response to the query; and
using, by the search engine, the likelihood as a signal for ranking search results.

16. The system of claim 15, wherein the operations further comprise identifying the first subset of query patterns that are expressed in a natural language format, including:
for each query pattern in the set of query patterns, determining a likelihood that the respective query pattern corresponds to a natural language query pattern; and
selecting the respective query pattern when the likelihood that the respective query pattern corresponds to a natural language query pattern satisfies a threshold.

17. The system of claim 15, wherein obtaining a set of query patterns that are associated with searching for a particular fact comprises:
obtaining a plurality of fact-seeking queries;
determining that a set of the fact-seeking queries relate to the particular fact; and
generating the set of query patterns from the set of the fact-seeking queries that relate to the particular fact.

18. The system of claim 15, wherein the likelihood corresponds to a ratio of the first quantity over the second quantity.

* * * * *